US012463372B2

(12) United States Patent
Lee et al.

(10) Patent No.: US 12,463,372 B2
(45) Date of Patent: Nov. 4, 2025

(54) CONNECTOR ASSEMBLY

(71) Applicant: DELTA ELECTRONICS, INC., Taoyuan (TW)

(72) Inventors: Lei-Ming Lee, Taoyuan (TW); Hung-Chuan Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 547 days.

(21) Appl. No.: 18/145,023

(22) Filed: Dec. 22, 2022

(65) Prior Publication Data

US 2024/0128676 A1 Apr. 18, 2024

(30) Foreign Application Priority Data

Oct. 18, 2022 (TW) .................................. 111139503

(51) Int. Cl.

| | |
|---|---|
| ***H01R 4/00*** | (2006.01) |
| ***H01R 4/28*** | (2006.01) |
| ***H01R 9/03*** | (2006.01) |
| ***H01R 13/514*** | (2006.01) |
| ***H01R 13/516*** | (2006.01) |
| ***H01R 13/627*** | (2006.01) |

(52) U.S. Cl.

CPC ............. *H01R 13/514* (2013.01); *H01R 4/28* (2013.01); *H01R 9/03* (2013.01); *H01R 13/516* (2013.01); *H01R 13/6273* (2013.01)

(58) Field of Classification Search

CPC .......... H01R 4/28; H01R 9/03; H01R 13/516; H01R 13/6273

See application file for complete search history.

(56) References Cited

U.S. PATENT DOCUMENTS

| | | | | |
|---|---|---|---|---|
| 9,843,112 B2 | 12/2017 | Zhu et al. | | |
| 11,715,922 B2 * | 8/2023 | Winey | H01R 13/6587 | 439/78 |
| 2009/0215309 A1 * | 8/2009 | Mongold | H01R 12/592 | 439/495 |
| 2012/0322289 A1 * | 12/2012 | Lin | H01R 13/622 | 439/345 |

(Continued)

FOREIGN PATENT DOCUMENTS

| | | |
|---|---|---|
| CN | 107768852 A | 3/2018 |
| CN | 211655148 U | 10/2020 |
| CN | 2212303983 U | 1/2021 |

(Continued)

*Primary Examiner* — Phuong Chi Thi Nguyen

(74) *Attorney, Agent, or Firm* — CKC & Partners Co., LLC

(57) ABSTRACT

A connector assembly includes a base, a wire unit, and a wire fixing unit. The base includes a body and two side wings. The two side wings are respectively rotatably connected to two opposite sides of the body, and each of the side wings includes a first fixing portion. The wire unit is located between the two side wings. The wire unit includes a connection seat disposed in the body, and various wires disposed in the connection seat and protruding from one side of the connection seat. The wire fixing unit includes two second fixing portions and various through holes, in which the through holes are located between the two second fixing portions, the two first fixing portions respectively clamp the two second fixing portions, and the wires correspondingly pass through the through holes.

15 Claims, 9 Drawing Sheets

(56) References Cited

U.S. PATENT DOCUMENTS

2021/0384691 A1 * 12/2021 Winey ................. H01R 12/716

FOREIGN PATENT DOCUMENTS

| | | | |
|---|---|---|---|
| JP | S63022076 | U | 2/1988 |
| JP | H03116675 | U | 12/1991 |
| TW | M298266 | U | 9/2006 |
| TW | 1625010 | B | 5/2018 |
| TW | M561935 | U | 6/2018 |

* cited by examiner

CONNECTOR ASSEMBLY

RELATED APPLICATIONS

This application claims priority to Taiwan Application Serial Number 111139503, filed Oct. 18, 2022, which is herein incorporated by reference.

BACKGROUND

Field of Invention

The present disclosure relates to a wire connection technology, and more particularly, to a connector assembly.

Description of Related Art

Electronic devices usually transmit signals and/or currents through flat cables. In some applications, the flat cable is first combined with a header base to form a header connector. With the miniaturization development of the electronic device, a plugging or installation space for the header connector is reduced. Accordingly, when plugging or installing the header connector, wires of the flat cable may be pulled due to the space constraint. Pulling the wires may cause poor electrical contact between the wires and the header base. In addition, the pulled wire may also be deflected, such that the distance between two adjacent wires is reduced, which may cause problems such as arcing, accidental contact, and/or signal interference to generate noise.

SUMMARY

Therefore, one objective of the present disclosure is to provide a connector assembly including a wire fixing unit, which can share most of the stress on a wire unit, such that the impact of the stress on the bonding of the wire unit and the base is greatly reduced, thereby effectively improving the contact stability of the wire unit and the base.

Another objective of the present disclosure is to provide a connector assembly, a wire fixing unit of which can prevent the deflection of wires of the wire unit, and can maintain the distance between adjacent wires, thereby preventing arcing, accidental contact, and/or signal interference between adjacent wires.

According to the aforementioned objectives of the present disclosure, a connector assembly is provided. The connector assembly includes a base, a wire unit, and a wire fixing unit. The base includes a body and two side wings. The two side wings are respectively rotatably connected to two opposite sides of the body, and each of the side wings includes a first fixing portion. The wire unit is located between the two side wings. The wire unit includes a connection seat disposed in the body, and plural wires disposed in the connection seat and protruding from one side of the connection seat. The wire fixing unit includes two second fixing portions and plural through holes, in which the through holes are located between the two second fixing portions, the two first fixing portions respectively clamp the two second fixing portions, and the wires correspondingly pass through the through holes.

According to one embodiment of the present disclosure, each of the first fixing portions includes two lugs.

According to one embodiment of the present disclosure, each of the first fixing portions further includes at least one first engaging portion disposed on at least one of the two lugs, and each of the second fixing portions includes at least one second engaging portion, in which the first engaging portions are correspondingly engaged with the second engaging portions.

According to one embodiment of the present disclosure, a number of the at least one first engaging portion of each of the first fixing portions is 2, the first engaging portions are respectively disposed on the two lugs, and a number of the at least one second engaging portion of each of the second fixing portions is 2, in which the first engaging portions are correspondingly engaged with the second engaging portions.

According to one embodiment of the present disclosure, one of the at least one first engaging portion and the at least one second engaging portion is a bump, and the other one of the at least one first engaging portion and the at least one second engaging portion is a concave.

According to one embodiment of the present disclosure, the two lugs of each of the first fixing portions apply a clamping force on one of the second fixing portions in two opposite directions, and the two directions are substantially perpendicular to an extending direction of the wires.

According to one embodiment of the present disclosure, the two lugs of each of the first fixing portions apply a clamping force on one of the second fixing portions in two opposite directions, and the two directions are substantially parallel to an extending direction of the wires.

According to one embodiment of the present disclosure, the wire fixing unit is a one-piece structure.

According to one embodiment of the present disclosure, the wire fixing unit includes two block structures, and the wires are sandwiched between the two block structures.

According to one embodiment of the present disclosure, the wire fixing unit includes an outlet end, the wires extend from the outlet end of the wire fixing unit, and the two side wings protrude out of the outlet end.

According to one embodiment of the present disclosure, the wire fixing unit includes an outlet end, the wires extend from the outlet end of the wire fixing unit, and the two side wings are substantially aligned with the outlet end.

According to the aforementioned objectives of the present disclosure, a connector assembly is additionally provided. The connector assembly includes a wire unit and a wire fixing unit. The wire unit includes a connection seat and various wires. The connection seat includes two first fixing portions located on one side of the connection seat. The wires are disposed in the connection seat, protrude from the side of the connection seat, and are located between the two first fixing portions. The wire fixing unit includes two second fixing portions and various through holes. The through holes are located between the two second fixing portions. The two first fixing portions are correspondingly engaged with the two second fixing portions. The wires correspondingly pass through the through holes.

According to one embodiment of the present disclosure, one of the two first fixing portions and the two second fixing portions is two concaves, and the other one of the two first fixing portions and the two second fixing portions is two clip fasteners.

According to one embodiment of the present disclosure, the wire fixing unit is a one-piece structure.

According to one embodiment of the present disclosure, the connector assembly further includes a base. The base includes a body and two side wings, and the two side wings are respectively rotatably connected to two opposite sides of the body. The wire unit is located between the two side wings, and the connection seat is disposed in the body.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
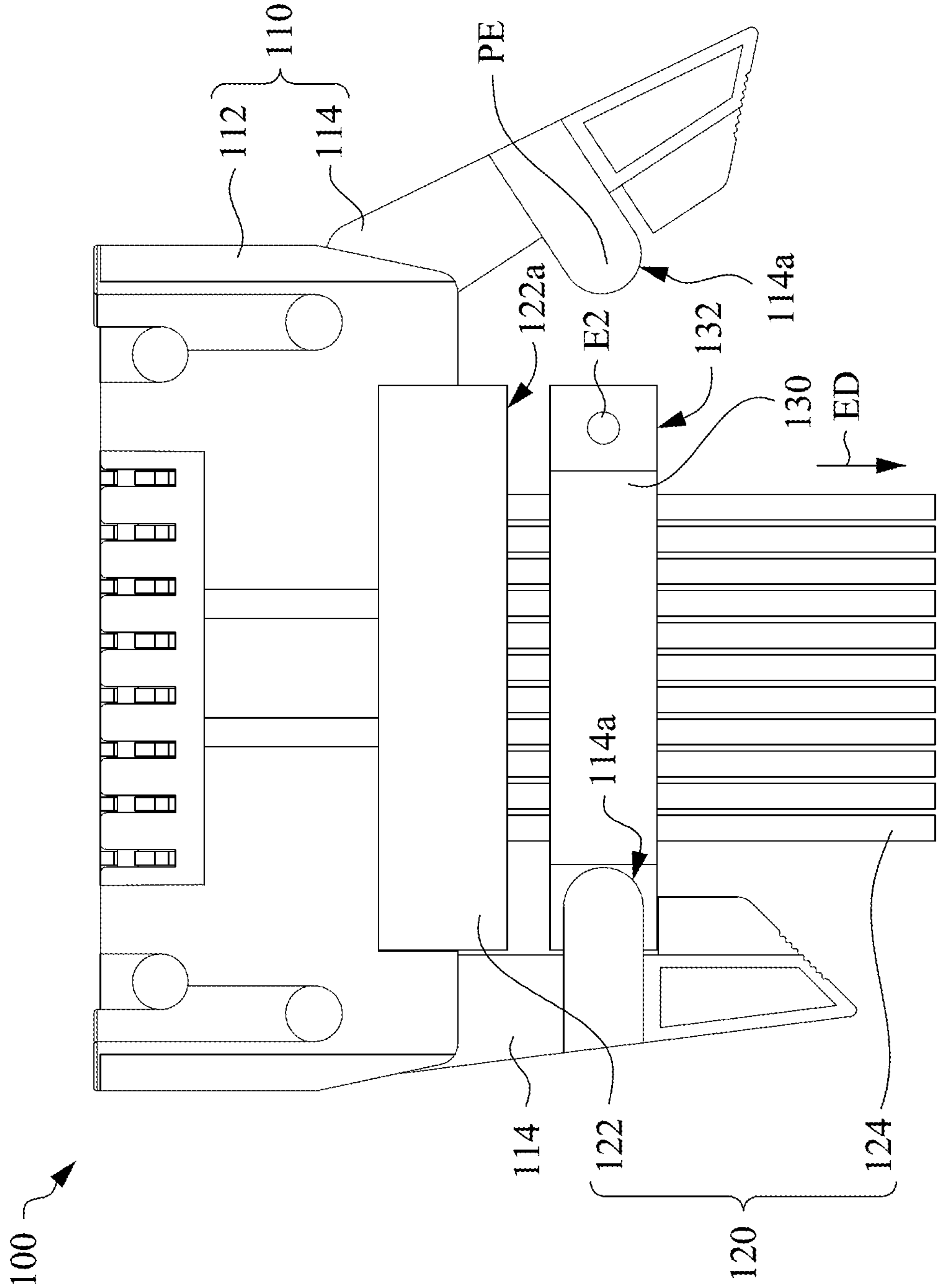
FIG. 1 is a schematic top view of a connector assembly in accordance with a first embodiment of the present disclosure.
Figure 2:
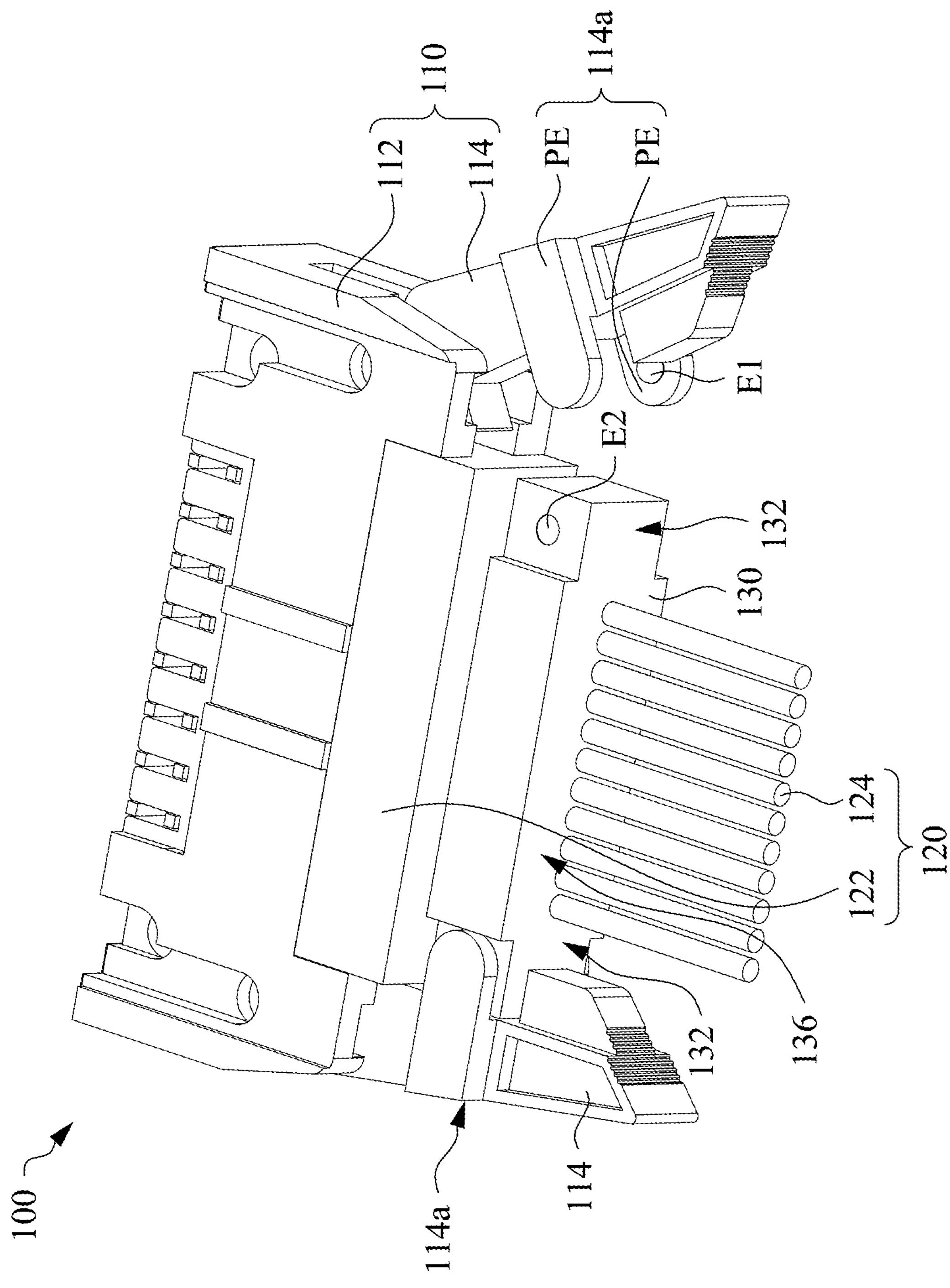
FIG. 2 is a schematic three-dimensional diagram of a connector assembly in accordance with the first embodiment of the present disclosure.
Figure 3:
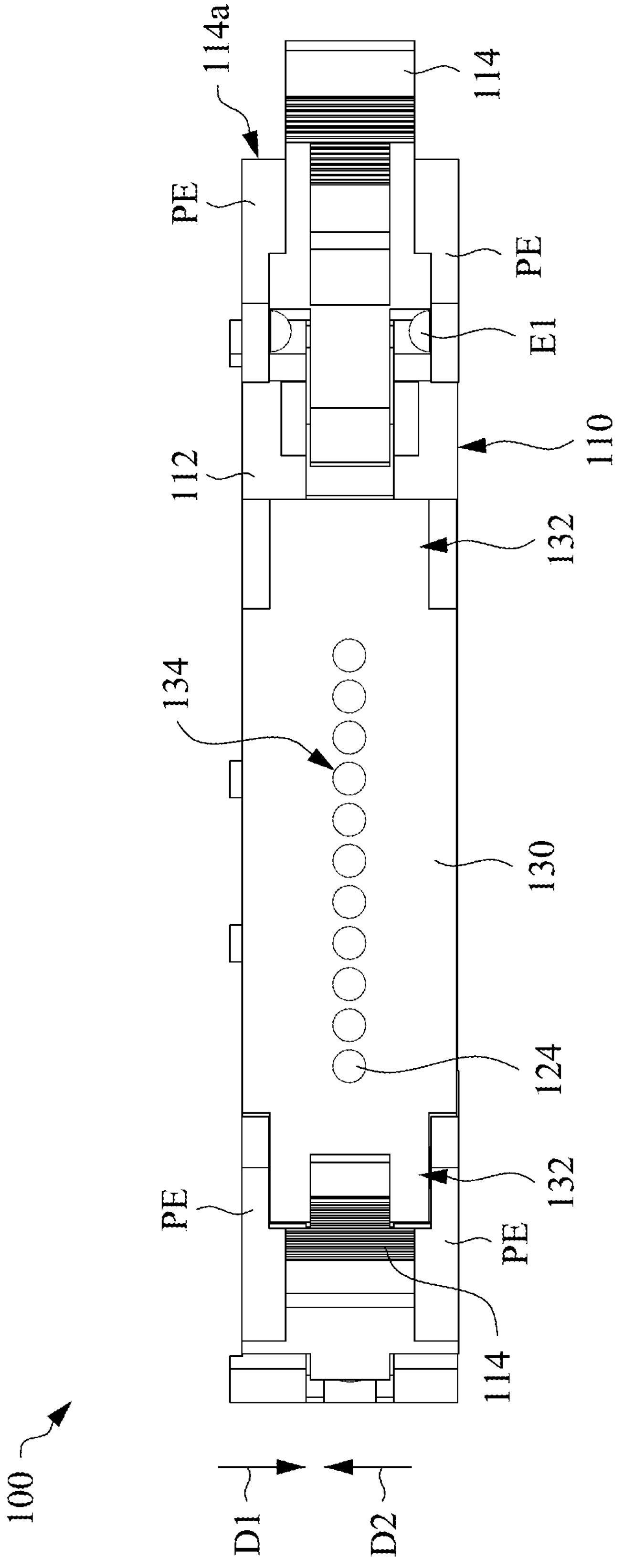
FIG. 3 is a schematic front view of a connector assembly in accordance with the first embodiment of the present disclosure.

Referring to FIG. 1 to FIG. 3, FIG. 1 to FIG. 3 are a schematic top view, a schematic three-dimensional diagram, and a schematic front view of a connector assembly in accordance with a first embodiment of the present disclosure. In the present embodiment, a connector assembly 100 mainly includes a base 110, a wire unit 120, and a wire fixing unit 130. In some examples, the base 110 is a header base. The base 110 may include a body 112 and two side wings 114. As shown in FIG. 1 and FIG. 2, the two side wings 114 can be pivotally connected to two opposite sides of the body 112 respectively, such that the two side wings 114 can be rotatably connected to the body 112 with the pivot joints as the rotation axes.

Each of the side wings 114 includes a first fixing portion 114*a*. The first fixing portions 114*a* of the two side wings 114 are opposite to each other. In some exemplary examples, as shown in FIG. 2 and FIG. 3, each of the first fixing portions 114*a* includes two lugs PE, in which the two lugs PE may be respectively disposed on an upper side and a lower side of the first fixing portion 114*a*, and may face each other. The two lugs PE of each of the first fixing portion 114*a* protrude and extend in a direction toward the other first fixing portion 114*a*. Each of the first fixing portions 114*a* may optionally include one or more first engaging portions E1. When each of the first fixing portions 114*a* includes one first engaging portion E1, the first engaging portion E1 is disposed on one of the two lugs PE, and the first engaging portion E1 faces the other one lug PE. When each of the first fixing portions 114*a* includes two first engaging portions E1, the two first engaging portions E1 may be respectively disposed on the two lugs PE, and the two first engaging portions E1 face each other. The two first engaging parts E1 may be disposed on the same lug PE. In some certain examples, the first fixing portion 114*a* may not have an engaging portion. As shown in FIG. 3, the first engaging portion E1 may be a bump. In other examples, the first engaging portion E1 may be a concave.

The wire unit 120 is connected to the base 110 and is located between the two side wings 114 of the base 110. As shown in FIG. 1, the wire unit 120 mainly includes a connection seat 122 and plural wires 124. The connection seat 122 is disposed in the body 112 of the base 110. The wires 124 are disposed in the connection seat 122 and protrude from one side 122*a* of the connection seat 122. The wires 124 may be substantially parallel to each other. The wires 124 may be arranged at a fixed pitch. In other examples, the pitches between the wires 124 are different from each other, or some of the pitches between the wires 124 are the same and the other of the pitches between the wires 124 are different. The wires 124 are connected to a circuit inside the base 110, such that the wire unit 120 is electrically connected to the base 110.

In some examples, as shown in FIG. 3, the wire fixing unit 130 is a one-piece structure and is a block. The wire fixing unit 130 includes two second fixing portions 132 and plural through holes 134. The two second fixing portions 132 are respectively located on two opposite sides of the wire fixing unit 130. The two first fixing portions 114*a* of the base 110 can respectively clamp the two second fixing portions 132. In some examples, each of the second fixing portions 132 includes one or more second engaging portions E2. The number, positions, and sizes of the second engaging portions E2 of each of the second fixing portions 132 correspond to the number, positions, and sizes of the first engaging portions E1 of the corresponding first fixing portion 114*a*. In addition, the structures of the second engaging portions E2 match the structures of the first engaging portions E1. In some examples, one of the first engaging portion E1 and the second engaging portion E2 is a bump, and the other one of the first engaging portion E1 and the second engaging portion E2 is a concave, whose structure and size are compatible with the bump. In the example shown in FIG. 2, the first engaging portions E1 are bumps, and the second engaging portions E2 are concaves. Thus, the first engaging portions E1 and the second engaging portions E2 can be correspondingly engaged.

Specifically, in the example that each of the first fixing portions 114*a* includes one first engaging portion E1, and the first engaging portion E1 is disposed on a bottom surface of the upper lug PE, the second engaging portion E2 is disposed in a top surface of the second fixing portion 132. In the embodiment that each of the first fixing portions 114*a* includes two first engaging portions E1, and the two first engaging portions E1 are respectively disposed on the bottom surface of the upper lug PE and a top surface of the lower lug PE, the second fixing portion 132 includes two second engaging portions E2 respectively disposed on the top surface and a bottom surface thereof, such that the two first engaging portions E1 and the two second engaging portions E2 can be correspondingly engaged with each other. The aforementioned number and arrangement positions of the corresponding first engaging portions E1 and the second engaging portions E2 are merely used for illustration, and the present embodiment is not limited thereto.

In some examples, the first fixing portion 114*a* and the second fixing portion 132 are not provided with an engaging portion. In such examples, each of the first fixing portions 114*a* clamps the second fixing portion 132 through the interference fit between the two lugs PE and the second fixing portion 132.

As shown in FIG. 2, the through holes 134 are arranged between the two second fixing portions 132. Extending directions of the through holes 134 may be substantially parallel to each other. The number of the through holes 134 may be the same as the number of the wires 124, or may be greater than the number of the wires 124. Each of the wires 124 has its corresponding through hole 134 in position. The wires 124 may pass through the corresponding through holes 134. Specifically, the wire fixing unit 130 includes an outlet end 136, and the wires 124 extend from the outlet end 136 of the wire fixing unit 130. In the present embodiment, the two side wings 114 protrude out of the outlet end 136.

As shown in FIG. 3, in the present embodiment, the two lugs PE of each of the first fixing portions 114*a* apply a clamping force to the corresponding second fixing portion 132 respectively along a first direction D1 and a second direction D2, which are opposite to each other. Referring to FIG. 1 simultaneously, the first direction D1 and the second direction D2 are substantially perpendicular to an extending direction ED of the wires 124.

The wires 124 are inserted into the through holes 134 of the wire fixing unit 130, and then the second fixing portions 132 of the wire fixing unit 130 are clamped by using the first fixing portions 114*a* of the side wings 114 of the base 110, such that the wires 124 can be stably fixed by the wire fixing unit 130. In the example shown in FIG. 1, the wire fixing unit 130 is physically separated from the connection seat 122 of the wire unit 120.

The stress on the wire unit 120 may fall on the wire fixing unit 130, such that the impact of the stress on the bonding between the wire unit 120 and the base 110 is reduced, and poor contact between the wire unit 120 and the base 110 is prevented. In addition, the wire fixing unit 130 can prevent the wires 124 passing through the connection seat 122 from being deflected, such that a distance between the adjacent wires 124 in the connection seat 122 is maintained, thereby preventing arcing between the adjacent wires 124, accidental contact between the adjacent wires 124, and/or signal interference between the adjacent wires 124 from occurring.

Figure 4:
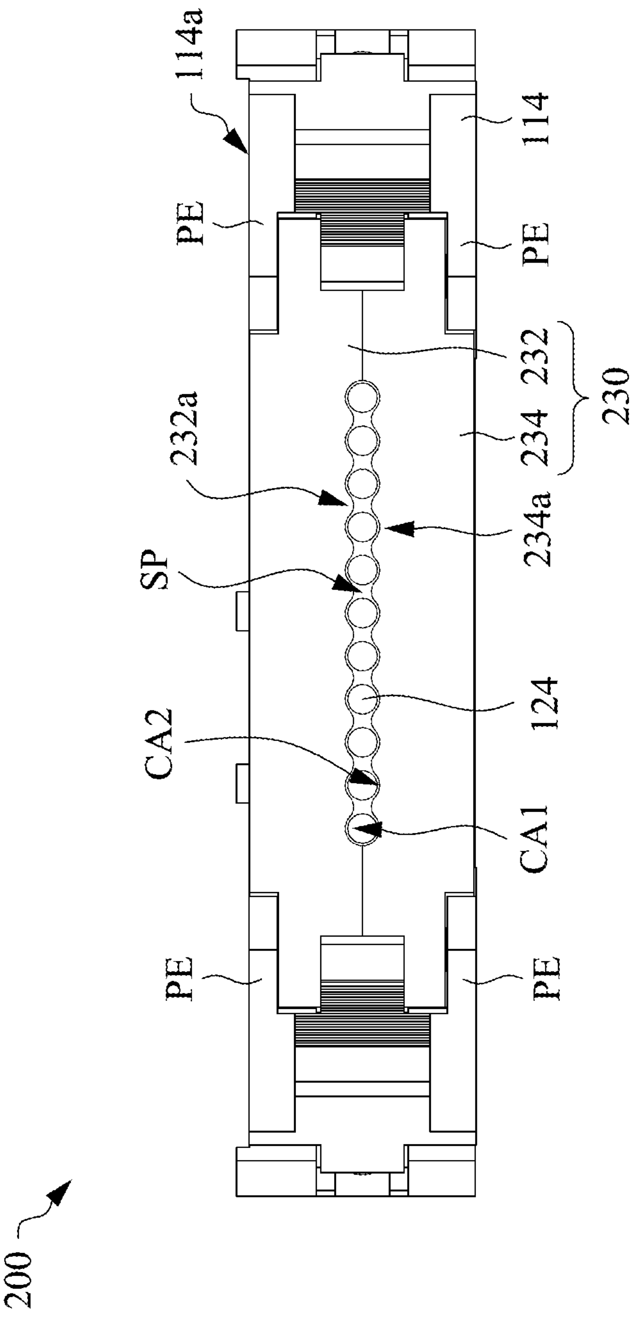
FIG. 4 is a schematic front view of a connector assembly in accordance with a second embodiment of the present disclosure.

Referring to FIG. 4, FIG. 4 is a schematic front view of a connector assembly in accordance with a second embodiment of the present disclosure. A structure of a connector assembly 200 of this embodiment is substantially the same as the structure of the connector assembly 100 described above. A difference between the connector assemblies 200 and 100 is that a wire fixing unit 230 of the connector assembly 200 includes a first block structure 232 and a second block structure 234, instead of being a one-piece structure as the wire fixing unit 130.

A bottom 232*a* of the first block structure 232 is provided with a first concave CA1, and a top 234*a* of the second block structure 234 is provided with a second concave CA2. The first concave CA1 and the second concave CA2 are opposite to each other, and positions of the first concave CA1 and the second concave CA2 correspond to each other. When the bottom 232*a* of the first block structure 232 and the top 234*a* of the second block structure 234 are butted together, the first concave CA1 and the second concave CA2 collectively form a space SP that can accommodate plural wires 124. In other words, the wires 124 are sandwiched between the first block structure 232 and the second block structure 234. The wires 124 are spaced apart from each other in the space SP.

Figure 5:
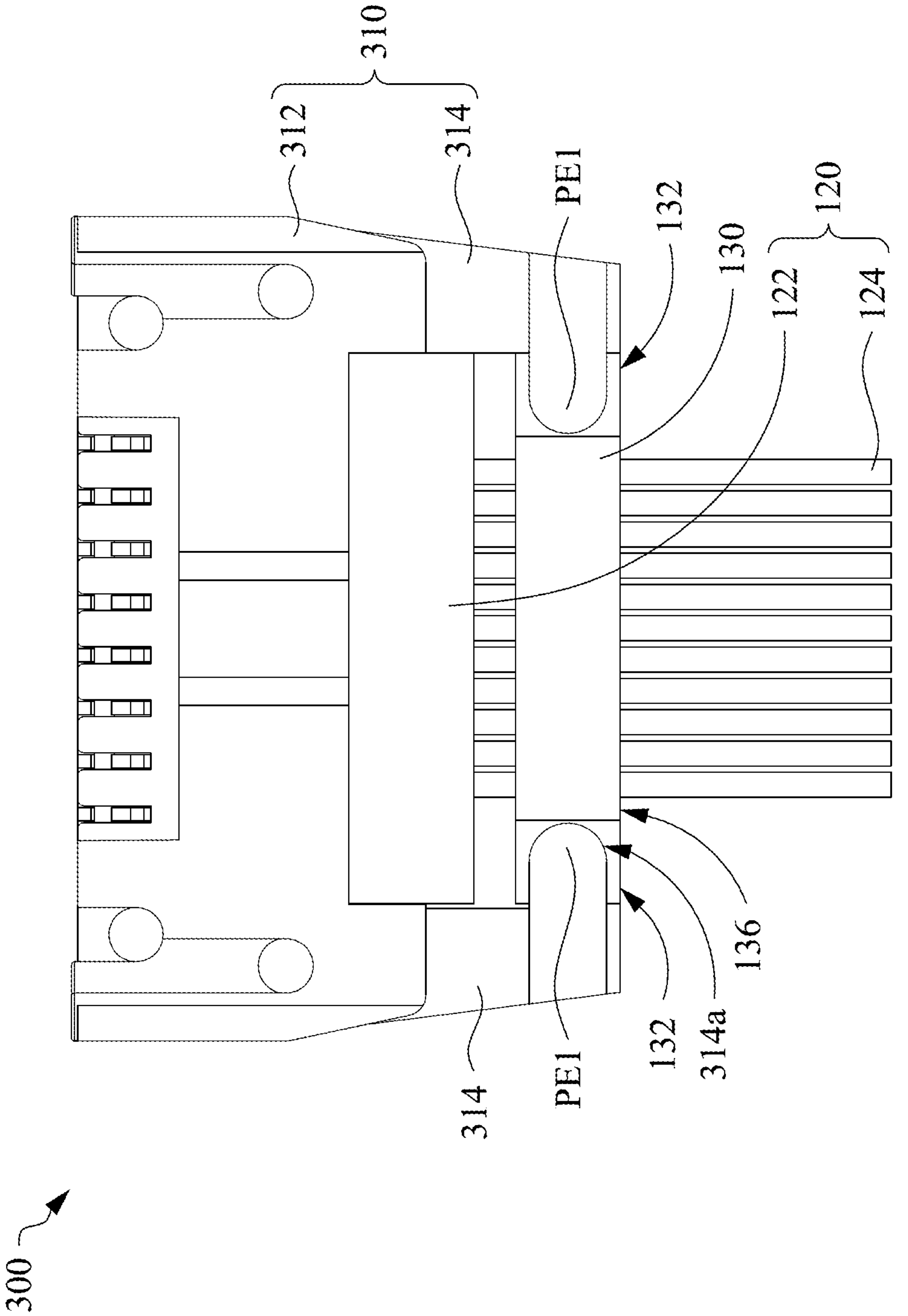
FIG. 5 is a schematic top view of a connector assembly in accordance with a third embodiment of the present disclosure.

Referring to FIG. 5, FIG. 5 is a schematic top view of a connector assembly in accordance with a third embodiment of the present disclosure. A structure of a connector assembly 300 of this embodiment is substantially the same as the structure of the connector assembly 100 described above, and a difference between the connector assemblies 300 and 100 is that a structure of a base 310 of the connector assembly 300 is different from a structure of the base 110 of the connector assembly 100.

The base 310 similarly includes a body 312 and two side wings 314. The two side wings 314 can be pivotally connected to two opposite sides of the body 312 respectively, such that the two side wings 314 can be rotatably connected to the body 312 with the pivot joints as the rotation axes. Each of the side wings 314 includes a first fixing portion 314*a*, and the first fixing portions 314*a* of the two side wings 314 are opposite to each other. Each of the first fixing portions 314*a* includes two lugs PE1, which are like the lugs PE of the first fixing portion 114*a*. The design of the lugs PE1 of the first fixing portion 314*a* is the same as the design of the lugs PE of the first fixing portion 114*a*, and will not be repeated here. The side wings 314 of the base 310 are shorter than the side wings 114 of the base 110. When the first fixing portions 314*a* of the side wings 314 are correspondingly engaged with the second fixing portions 132 of the wire fixing unit 130, the two side wings 314 are substantially aligned with the outlet end 136 of the wire fixing unit 130.

Figure 6:
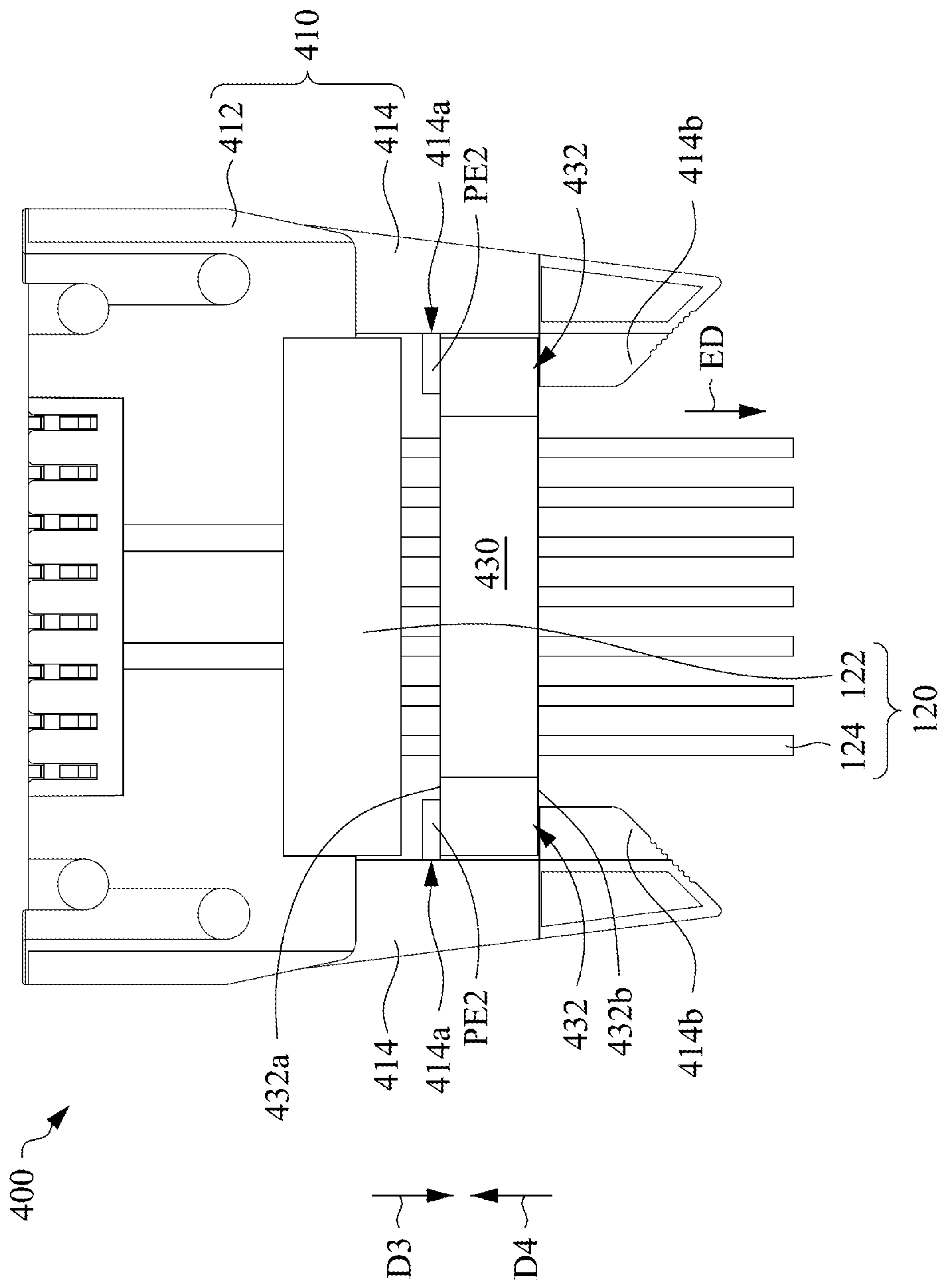
FIG. 6 is a schematic top view of a connector assembly in accordance with a fourth embodiment of the present disclosure.

Referring to FIG. 6, FIG. 6 is a schematic top view of a connector assembly in accordance with a fourth embodiment of the present disclosure. A structure of a connector assembly 400 of this embodiment is substantially the same as the structure of the connector assembly 100 described above, and a difference between the connector assemblies 400 and 100 is that a direction in which a base 410 of the connector assembly 400 applies a clamping force to a wire fixing unit 430 is different from that of the connector assembly 100.

In the connector assembly 400, a base 410 similarly includes a body 412 and two side wings 414. A connection method of the body 412 and the two side wings 414 is the same as that of the base 110, and will not be repeated here. Each of the side wings 414 includes a first fixing portion 414*a*. The first fixing portions 414*a* of the two side wings 414 may be opposite to each other. In some examples, each of the first fixing portions 414*a* may include a lug PE2, and the lug PE2 protrudes and extends from an inner side surface of the side wing 414 toward the opposite side wing 414. Each of the side wings 414 may further include a protruding portion 414*b*. The lug PE2 and the protruding portion 414*b* of each of the side wings 414 can respectively clamp the second fixing portion 432 from a first side surface 432*a* and a second side surface 432*b* of a second fixing portion 432 of the wire fixing unit 430, which are opposite to each other. Specifically, the lug PE2 of each of the first fixing portions 414*a* and the protruding portion 414*b* of the side wing 414 apply a clamping force on the corresponding second fixing portion 432 respectively along a third direction D3 and a fourth direction D4, which are opposite to each other. The third direction D3 and the fourth direction D4 are substantially parallel to the extending direction ED of the wires 124.

In some examples, each of the first fixing portions 414*a* may include two lugs PE2. The two lugs PE2 of each of the side wings 414 can clamp the second fixing portion 432 from the first side surface 432*a* and the second side surface 432*b* of the second fixing portion 432 of the wire fixing unit 430, which are opposite to each other. That is, one of the lugs PE2 of each of the first fixing portions 414*a* replaces the protruding portion 414*b* of the aforementioned side wing 414 to apply the clamping force on the second fixing portion 432. The two lugs PE2 of each of the first fixing portions 414*a* apply the clamping force to the corresponding second fixing portion 432 respectively along the opposite third direction D3 and the fourth direction D4.

Figure 7:
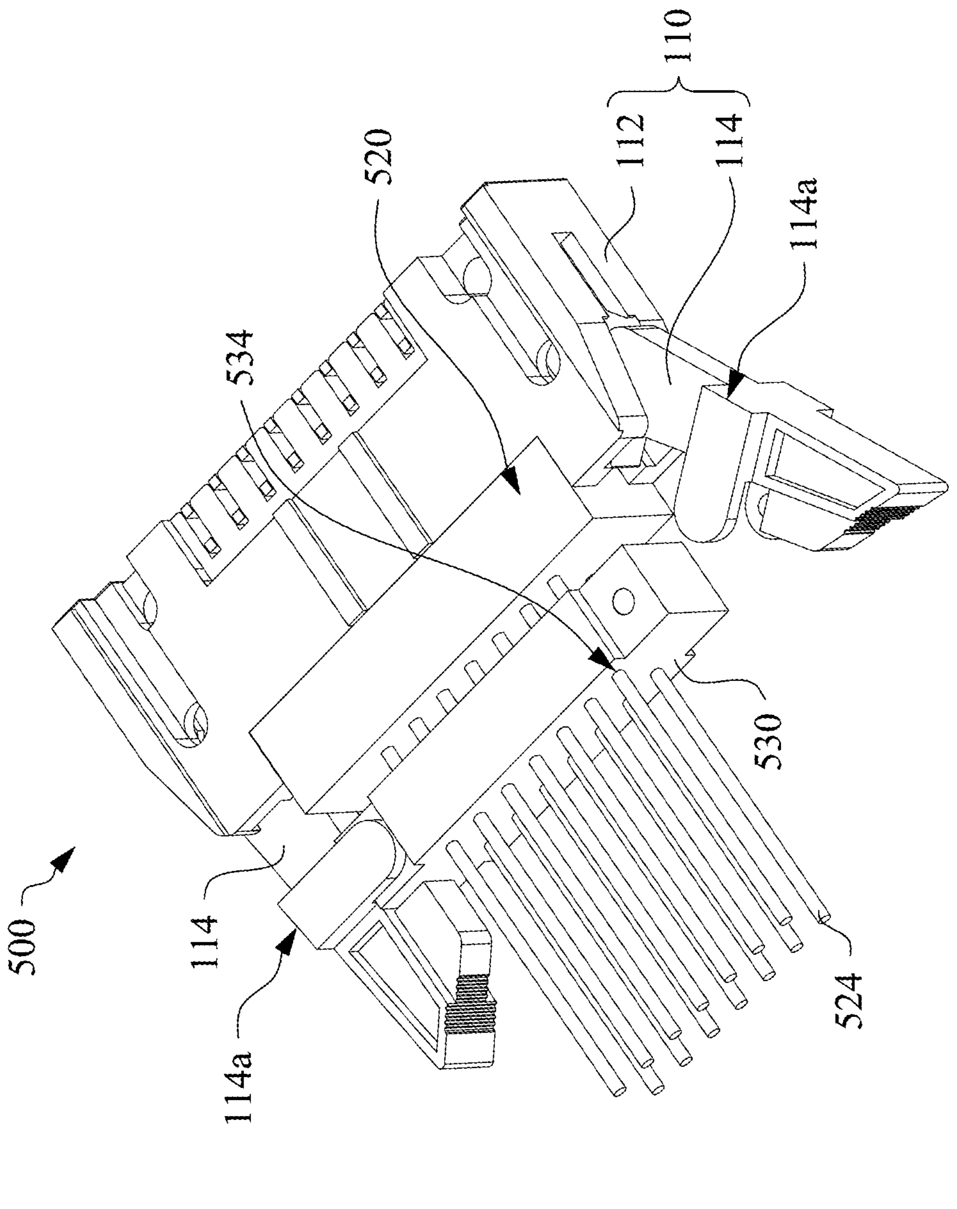
FIG. 7 is a schematic three-dimensional diagram of a connector assembly in accordance with a fifth embodiment of the present disclosure.

Referring to FIG. 7, FIG. 7 is a schematic three-dimensional diagram of a connector assembly in accordance with a fifth embodiment of the present disclosure. A structure of a connector assembly 500 of this embodiment is substantially the same as the structure of the connector assembly 100 described above, and a difference between the connector assemblies 500 and 100 is that wires 524 of a wire unit 520 are arranged in an upper row and a lower row. In response to the arrangement of the wires 524 of the wire unit 520, through holes 534 of a wire fixing unit 530 are correspondingly adjusted into two rows to accommodate the wires 524.

Figure 8A:
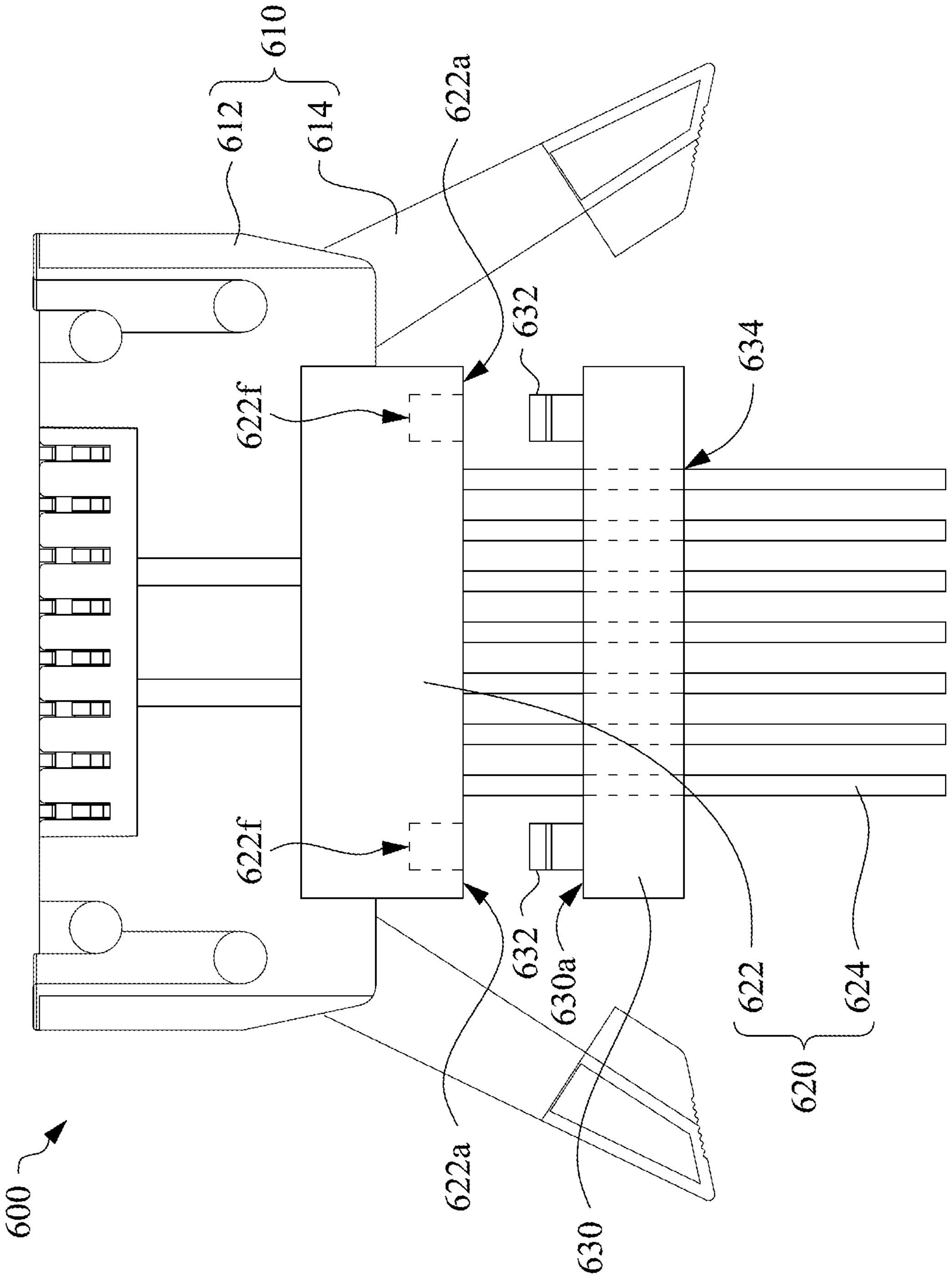
FIG. 8A and FIG. 8B are schematic diagrams showing the assembly of a connector assembly in accordance with a sixth embodiment of the present disclosure.
Figure 8B:
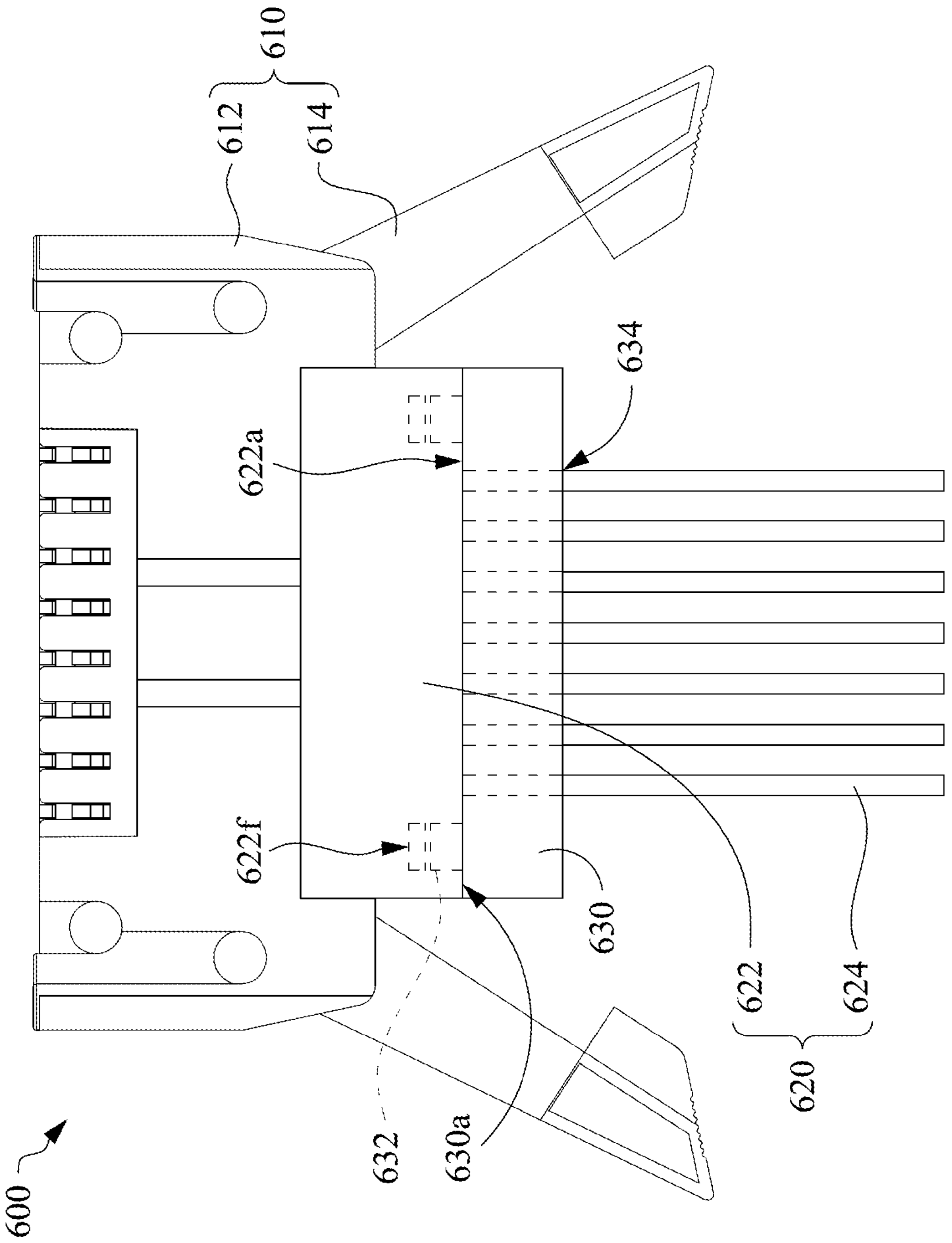

Referring to FIG. 8A and FIG. 8B, FIG. 8A and FIG. 8B are schematic diagrams showing the assembly of a connector assembly in accordance with a sixth embodiment of the present disclosure. A connector assembly 600 may mainly include a wire unit 620 and a wire fixing unit 630. The wire unit 620 mainly includes a connection seat 622 and plural wires 624. The connection seat 622 includes two first fixing portions 622*f*. The two first fixing portions 622*f* are located on one side surface 622*a* of the connection seat 622, and may be, for example, adjacent to two opposite ends of the connection seat 622 respectively. The wires 624 are disposed in the connection seat 622, and protrude and extend from the side surface 622*a* of the connection seat 622. For example, the wires 624 are located between the two first fixing portions 622*f*. The wires 624 may be substantially parallel to each other. In addition, the wires 624 may be arranged at a fixed pitch, or the pitches between the wires 624 may be different from each other or not all the same.

The wire fixing unit 630 may be a one-piece structure and is a block. The wire fixing unit 630 includes two second fixing portions 632 and plural through holes 634. The two second fixing portions 632 are located on one side surface 630*a* of the wire fixing unit 630, and may be, for example, adjacent to two opposite ends of the wire fixing unit 630 respectively. Positions and sizes of the two second fixing portions 632 correspond to positions and sizes of the first fixing portions 622*f* of the connection seat 622, and structures of the second fixing portions 632 match structures of the first fixing portions 622*f*. In some examples, one of the first fixing portion 622*f* and the second fixing portion 632 is a concave, and the other one of the first fixing portion 622*f* and the second fixing portion 632 is a clip fastener. For example, the clip fastener may be any suitable clip fastener such as a straight arm clip fastener, an L-type clip fastener, a circular clip fastener, a U-type clip fastener, etc. In the example shown in FIG. 8A, the first fixing portion 622*f* is a concave, and the second fixing portion 632 is a clip fastener. Thus, the first fixing portion 622*f* and the second fixing portion 632 can be correspondingly engaged with each other.

The through holes 634 are arranged between two second fixing portions 632. Extending directions of the through holes 634 may be substantially parallel to each other. The number of the through holes 634 may be the same as the number of the wires 624 or greater than the number of the wires 624. Each of the wires 624 has its corresponding through hole 634 in position. The wires 624 can pass through the corresponding through holes 634.

As shown in FIG. 8A, the wires 624 may be inserted into the through holes 634 of the wire fixing unit 630, and next the wire fixing unit 630 may be pushed to the side surface 622*a* of the connection seat 622 along the wires 624. Then, as shown in FIG. 8B, the first fixing portions 622*f* of the connection seat 622 are correspondingly engaged with the second fixing portions 632 of the wire fixing unit 630, such that the wire fixing unit 630 is fixed on the wire unit 620. Now, the side surface 622*a* of the connection seat 622 and the side surface 630*a* of the wire fixing unit 630 may be correspondingly connected to each other.

In the embodiment, the connector assembly 600 may further include a base 610. The base 610 may be a header base. Similarly, the base 610 may include a body 612 and two side wings 614. The two side wings 614 can be pivotally connected to two opposite sides of the body 612 respectively, such that the two side wings 614 can be rotatably connected to the body 612 with the pivot joints as the rotation axes. The base 610 is different from the base 110 of FIG. 1 in that the side wings 614 of the base 610 are not provided with fixing portions for clamping the wire fixing unit 630. The wire unit 620 is engaged with the base 610, and is located between the two side wings 614. The connection seat 622 is disposed in the body 612.

According to the aforementioned embodiments, one advantage of the present disclosure is that a connector assembly of the present disclosure includes a wire fixing unit. The wire fixing unit can share most of the stress on a wire unit, such that the impact of the stress on the bonding of the wire unit and the base is greatly reduced, thereby effectively improving the contact stability of the wire unit and the base.

Another advantage of the present disclosure is that a wire fixing unit of a connector assembly of the present disclosure can prevent the deflection of wires of the wire unit, and can maintain the distance between adjacent wires, thereby preventing arcing, accidental contact, and/or signal interference between adjacent wires.

Although the present disclosure has been disclosed above with the embodiments, it is not intended to limit the present disclosure. Any person having ordinary skill in the art can make various changes and modifications without departing from the spirit and scope of the present disclosure. Therefore, the scope of the present disclosure shall be determined by the appended claims.

What is claimed is:

1. A connector assembly, comprising:

a base comprising a body and two side wings, wherein the two side wings are respectively rotatably connected to two opposite sides of the body, and each of the two side wings comprises a first fixing portion;

a wire unit located between the two side wings, wherein the wire unit comprises:

a connection seat disposed in the body; and a plurality of wires disposed in the connection seat and protruding from one side of the connection seat; and a wire fixing unit comprising two second fixing portions and a plurality of through holes, wherein the through holes are located between the two second fixing portions, the first fixing portions respectively clamp the two second fixing portions, and the wires correspondingly pass through the through holes.

2. The connector assembly of claim 1, wherein the wire fixing unit is a one-piece structure.

3. The connector assembly of claim 1, wherein the wire fixing unit comprises two block structures, and the wires are sandwiched between the two block structures.

4. The connector assembly of claim 1, wherein the wire fixing unit comprises an outlet end, the wires extend from the outlet end of the wire fixing unit, and the two side wings protrude out of the outlet end.

5. The connector assembly of claim 1, wherein the wire fixing unit comprises an outlet end, the wires extend from the outlet end of the wire fixing unit, and the two side wings are aligned with the outlet end.

6. The connector assembly of claim 1, wherein each of the first fixing portions comprises two lugs.

7. The connector assembly of claim 6, wherein the two lugs of each of the first fixing portions apply a clamping force on one of the second fixing portions in two opposite directions, and the two directions are perpendicular to an extending direction of the wires.

8. The connector assembly of claim 6, wherein the two lugs of each of the first fixing portions apply a clamping force on one of the second fixing portions in two opposite directions, and the two directions are parallel to an extending direction of the wires.

9. The connector assembly of claim 6, wherein each of the first fixing portions further comprises at least one first engaging portion disposed on at least one of the two lugs, and each of the two second fixing portions comprises at least one second engaging portion, wherein the first engaging portions are correspondingly engaged with the second engaging portions.

10. The connector assembly of claim 9, wherein a number of the at least one first engaging portion of each of the first fixing portions is 2, the first engaging portions are respectively disposed on the two lugs, and a number of the at least one second engaging portion of each of the two second fixing portions is 2, wherein the first engaging portions are correspondingly engaged with the second engaging portions.

11. The connector assembly of claim 9, wherein one of the at least one first engaging portion and the at least one second engaging portion is a bump, and the other one of the at least one first engaging portion and the at least one second engaging portion is a concave.

12. A connector assembly, comprising:

a wire unit comprising:

a connection seat comprising two first fixing portions located on one side of the connection seat; and a plurality of wires disposed in the connection seat, protruding from the side of the connection seat, and located between the two first fixing portions; and a wire fixing unit comprising two second fixing portions and a plurality of through holes, wherein the through holes are located between the two second fixing portions, the two first fixing portions are correspondingly engaged with the two second fixing portions, and the wires correspondingly pass through the through holes.

13. The connector assembly of claim 12, wherein one of the two first fixing portions and the two second fixing portions is two concaves, and the other one of the two first fixing portions and the two second fixing portions is two clip fasteners.

14. The connector assembly of claim 12, wherein the wire fixing unit is a one-piece structure.

15. The connector assembly of claim 12, further comprising a base, wherein the base comprises a body and two side wings, the two side wings are respectively rotatably connected to two opposite sides of the body, the wire unit is located between the two side wings, and the connection seat is disposed in the body.

* * * * *